UNITED STATES PATENT OFFICE 2,644,832

ALKANOL AMINE SULFATES

Milton Kosmin, Dayton, Ohio, assignor to Monsanto Chemical Company, St. Louis, Mo., a corporation of Delaware No Drawing. Application April 16, 1951,
Serial No. 221,318

5 Claims. (Cl. 260—458)

The present invention relates to compounds having high surface-activity in aqueous solutions and to processes for preparing the said compounds.

In my copending application Serial No. 171,560, now Patent No. 2,617,830, filed June 30, 1950, I have disclosed polyglycol ethers of 7-ethyl-2-methylundecanol-4. These products are produced by condensing ethylene oxide with 7-ethyl-2-methylundecanol-4. While the condensates thus obtained show very good detergency, they are not sufficiently soluble in water to permit the preparation of aqueous solutions having a concentration of more than, say, 50% of condensate. Hence they cannot be used for the preparation of liquid detergents of adequate sudsing properties.

I have now found that if at least 3, but less than 20, moles of ethylene oxide be condensed with 7-ethyl-2-methylundecanol-4, and the resulting hydroxy ethers are converted to certain alkanolamine sulfates there is obtained a series of extremely water-soluble products which exhibits very good wetting-out and detergency properties.

The present products are prepared by condensing ethylene oxide with 7-ethyl-2-methylundecanol-4 until at least 3 moles, but not in excess of 19 moles, have been condensed with the alcohol and then sulfating and neutralizing the resulting condensation product with certain alkanolamines. The condensation may be carried out by mixing ethylene oxide either as gas or liquid with the alcohol and heating to a temperature of from 110 to 170° C. The condensation reaction is aided by the presence of a catalyst. For this purpose any alkaline materials, such as an alkali metal hydroxide or alcoholate may be used. The catalyst may be employed in relatively small amounts, usually from 0.5% to 1% being employed. The catalyst is added to the liquid alcohol at the beginning of the reaction. Sulfation of the alcohol-ethylene oxide condensate may be effected in known manner; for example, by reaction with dilute or concentrated sulfuric acid, oleum, sulfur trioxide, chlorosulfonic acid, etc. The sulfuric acid esters thus obtained are then neutralized, i. e., converted to salts by treatment with an alkanolamine having the general formula

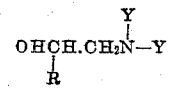

in which R is selected from the class consisting of hydrogen and the methyl radical and Y is selected from the class consisting of hydrogen and the radical $$-CH_2CHOH$$
$$\phantom{-CH_2CH}R$$

Alkanolamines having the above general formula are ethanolamine, diethanolamine, triethanolamine, isopropanolamine, diisopropanolamine and triisopropanolamine.

The products so produced are alkali metal sulfates of hydroxy ethers and are believed to have the structure:

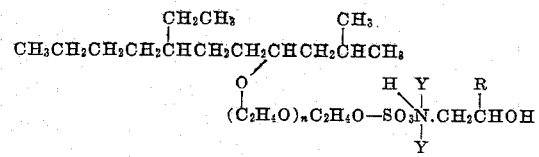

in which $n$ is an integer having a value of from 2 to 18, R is selected from the class consisting of hydrogen and the methyl radical, and Y is selected from the class consisting of hydrogen and the radical

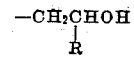

The following examples will further illustrate this invention:

Example 1

450.2 (2.1 moles) of 7-ethyl-2-methylundecanol-4 were placed in a glass flask, 4.5 g. of powdered KOH added and the contents then heated to 135° C. A stream of gaseous ethylene oxide was passed into the alcohol by means of a gas dispersing tube and the stream continued until 464 g. of ethylene oxide had combined. The mass became hot due to the exothermic reaction heat and the temperature was controlled by cooling the flask by the application of cold water to the exterior. In this way the temperature was maintained at 150-155° C. during the progress of the reaction. The condensate thus obtained was the pentaethylene glycol ether of 7-ethyl-2-methylundecanol-4.

196 g. of this condensation product was dissolved on approximately 1000 ml. of liquid sulfur dioxide and to this there was added, dropwise, 41.5 g. of sulfur trioxide, during a period of about 8 minutes. The resulting solution was then stirred until most of the sulfur dioxide had evaporated. 200 ml. of 90% ethanol was then added and the whole was stirred under full water pump vacuum to remove sulfur dioxide. The product thus obtained consisted of an ethanol solution of the sulfated pentaethylene glycol ether of 7-ethyl-2-methylundecanol-4.

A portion of the sulfated product obtained above was treated with monoethanolamine. The ethanol was then stripped from the neutralized material and the product was then dried in a stirred reactor at a temperature of 50-55° C./25-30 mm., Hg pressure. The dried product was the substantially pure monoethanolamine salt of sulfated pentaethylene glycol ether of 7-ethyl-2-methylundecanol-4, a viscous liquid. It is designated as I-1 in the tests reported in Example 2.

Neutralization of another portion of the sulfated pentaethylene glycol ether of 7-ethyl-2-methylundecanol-4 obtained above with diethanolamine, and subsequent drying as above, gave the diethanolamine salt of sulfated pentaethylene glycol ether of 7-ethyl-2-methylundecanol-4, a viscous liquid. This compound is designated as I-2 in tests reported in Example 2.

Neutralization with triethanolamine of still another portion of the sulfated pentaethylene glycol ether obtained above, and subsequent drying, gave the triethanolamine salt of sulfated pentaethylene glycol ether of 7-ethyl-2-methylundecanol-4. This compound is designated as I-3 in tests reported in Example 2.

*Example 2*

The speed of wetting, as measured by the Draves test of the products of Example 1 when dissolved in water to form solutions of the indicated concentrations gave the values shown below. Similarly obtained values for 2 related compounds are included for purposes of comparison.

| Product Tested | Draves Wetting (Seconds at percent concentration) | | | |
|---|---|---|---|---|
| | 0.5 | 0.25 | 0.125 | 0.062 |
| I-1 | 2.4 | 5.8 | 16.1 | 48.3 |
| I-2 | 2.8 | 6.7 | 21.5 | 77.7 |
| I-3 | 3.4 | 7.8 | 27.4 | 113.6 |
| Diethanolamine salt of sulfated pentaethylene glycol ether of 5-ethylnonanol-2 | 4.5 | 14.5 | 108 | 180+ |

Evaluation of the detergent properties of the present products, employing the evaluating method described by Jay C. Harris in Soap and Sanitary Chemicals for August and September 1943, also gave good results. Thus at 50 p. p. m. water-hardness, the triethanolamine salt of sulfated pentaethylenglycol ether of 7-ethyl-2-methylundecanol-4 had a detergency of 102% as compared to Gardinol WA, a commercial detergent produced by sulfating the alcohols derived by hydrogenation of coconut oil fatty acids.

Evaluation of the foaming properties of the products of Examples 1 and 2 as measured by the Ross-Miles lather test (proposed method of the American Society for Testing Materials), gave the following values:

| Product Tested | Ross-Miles Lather Heights (cm.) | | | |
|---|---|---|---|---|
| | 50 p. p. m. | | 300 p. p. m. | |
| | At Once | 5 min. | At Once | 5 min. |
| I-1 | 13.4 | 10.5 | 10.2 | 8.0 |
| I-2 | 12.6 | 10.5 | 10.3 | 8.5 |
| I-3 | 11.7 | 10.0 | 10.2 | 7.5 |
| Triethanolamine salt of sulfated pentaethylene glycol ether of 5-ethylnonanol-2 | 7.7 | 2.0 | 7.6 | 1.0 |

What I claim is:
1. Chemical compounds having the formula

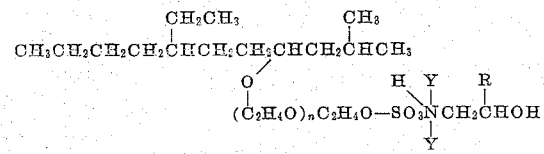

in which $n$ is an integer having a value of from 2 to 18, R is selected from the class consisting of hydrogen and the methyl radical and Y is selected from the class consisting of hydrogen and the radical $$-CH_2CHOH$$
$$\phantom{-CH_2C}|$$
$$\phantom{-CH_2CH}R$$

2. Chemical compounds having the formula

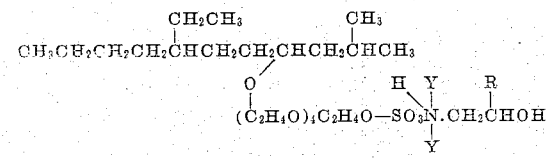

R is selected from the class consisting of hydrogen and the methyl radical and Y is selected from the class consisting of hydrogen and the radical $$-CH_2CHOH$$
$$\phantom{-CH_2C}|$$
$$\phantom{-CH_2CH}R$$

3. The chemical compound having the formula

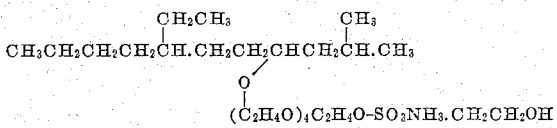

4. The chemical compound having the formula

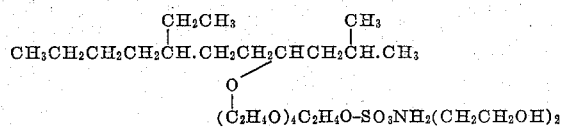

5. The chemical compound having the formula

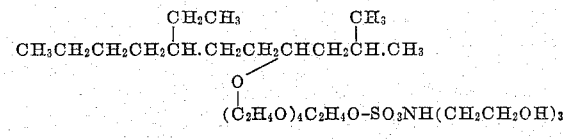

MILTON KOSMIN.

References Cited in the file of this patent
UNITED STATES PATENTS

| Number | Name | Date |
|---|---|---|
| 1,970,578 | Schoeller et al. | Aug. 21, 1934 |
| 2,174,761 | Schuette | Oct. 3, 1939 |
| 2,212,521 | Harris | Aug. 27, 1940 |